(12) United States Patent
Dhall

(10) Patent No.: US 8,439,314 B1
(45) Date of Patent: May 14, 2013

(54) AIRCRAFT HAVING OFFSET TELESCOPIC WINGS

(76) Inventor: Sanjay Dhall, Canton, MI (US)

(*) Notice: Subject to any disclaimer, the term of this patent is extended or adjusted under 35 U.S.C. 154(b) by 353 days.

(21) Appl. No.: 12/834,934

(22) Filed: Jul. 13, 2010

Related U.S. Application Data

(63) Continuation-in-part of application No. 11/935,448, filed on Nov. 6, 2007, now Pat. No. 7,762,500.

(60) Provisional application No. 60/856,916, filed on Nov. 6, 2006.

(51) Int. Cl.
*B64C 3/56* (2006.01)

(52) U.S. Cl.
USPC ............................. 244/218; 244/45 R; 244/2

(58) Field of Classification Search ............... 244/218, 244/2, 39, 45 R, 46, 49, 99.11, 172.6
See application file for complete search history.

(56) References Cited

U.S. PATENT DOCUMENTS

| | | | |
|---|---|---|---|
| 1,653,903 A | 12/1927 | Hall | |
| 1,904,281 A * | 4/1933 | Ellingston | 244/202 |
| 2,056,188 A | 10/1936 | Hayden | |
| 2,076,059 A | 4/1937 | Asbury | |
| 2,423,095 A | 7/1947 | Gibson | |
| 2,464,285 A * | 3/1949 | Andrews | 244/7 R |
| 3,065,938 A | 11/1962 | Calkins | |
| 3,986,686 A | 10/1976 | Girard | |
| 4,824,053 A | 4/1989 | Sarh | |
| 4,881,700 A | 11/1989 | Sarh | |
| 4,986,493 A | 1/1991 | Sarh | |
| 5,203,520 A | 4/1993 | Przygodzki et al. | |
| 6,056,237 A * | 5/2000 | Woodland | 244/3.15 |
| 6,131,848 A | 10/2000 | Crow | |
| 6,618,584 B1 | 9/2003 | Carneheim et al. | |
| 6,834,835 B1 | 12/2004 | Knowles et al. | |
| 6,910,662 B1 * | 6/2005 | Ofner | 244/219 |

* cited by examiner

*Primary Examiner* — Timothy D Collins
*Assistant Examiner* — Brian M O'Hara
(74) *Attorney, Agent, or Firm* — Young Basile Hanlon & MacFarlane P.C.

(57) ABSTRACT

An aircraft includes a fuselage, a first wing, and a second wing. The first wing and the second wing each have at least two wing panels, where the at least two wing panels of each wing are telescopically related to one another for movement between an extended position and a retracted position. The first wing and the second wing are both connected to the fuselage and are positioned with respect to the fuselage such that the first wing is offset with respect to the second wing.

16 Claims, 15 Drawing Sheets

AIRCRAFT HAVING OFFSET TELESCOPIC WINGS

CROSS-REFERENCE TO RELATED APPLICATIONS

This application is a continuation-in-part of U.S. patent application Ser. No. 11/935,448, filed on Nov. 6, 2007, which claims the benefit of U.S. Provisional Patent Application No. 60/856,916, filed on Nov. 6, 2006.

FIELD OF THE INVENTION

The invention relates to the field of aircraft wing structures wherein the space occupied by the wings may be reduced when they are not in use.

BACKGROUND OF THE INVENTION

Aircraft wings are necessarily large, and their size makes it difficult to move and store an aircraft when it is not in flight. Accordingly, many designs have been previously proposed for reducing the space occupied by aircraft wings when the aircraft is not in flight. One area of particular applicability of such designs arises with regard to so-called roadable aircraft. Generally stated, roadable aircraft are aircraft that may be converted for surface travel upon a roadway.

Most of the previously-proposed designs for reducing the space occupied by the wings of an aircraft when it is not in flight can be characterized either as folding wing designs or telescopic wing designs. Since foldable wing designs leave the entire wing exposed when folded, a roadable aircraft having folded wings would experience significant adverse wind loading on its wings when operated as a surface vehicle. Thus, foldable wings are not well suited to use with roadable aircraft.

Although telescopic wing designs necessarily contemplate a retracted position wherein the extent to which the wing is exposed during surface travel is reduced, a majority of previous designs offer only a limited degree of wing size reduction. Since roadable aircraft must be designed so as to fit within the travel lane of a roadway, those telescopic wing structures that provide only limited wing size reduction and thus are not suited for use with roadable aircraft. Although telescopic wing designs have been proposed that do provide a significant reduction in the length of the wing by using telescopic structural spars, telescoping structural members are costly to produce, and require complex extension and retraction mechanisms.

A telescopic wing that provides for a significant reduction in wing length by providing an articulated structural spar has not previously been known.

SUMMARY OF THE INVENTION

An aircraft having offset telescopic wings is taught herein. The aircraft includes a fuselage, a first wing, and a second wing. The first wing and the second wing each have at least two wing panels, where the at least two wing panels of each wing are telescopically related to one another for movement between an extended position and a retracted position. The first wing and the second wing are both connected to the fuselage and are positioned with respect to the fuselage such that the first wing is offset with respect to the second wing.

The first wing may be elevationally offset with respect to the second wing. Furthermore, a bottom surface of the first wing may be disposed at a higher elevation than a top surface of the second wing.

The first wing may be longitudinally offset with respect to the second wing. Furthermore, a trailing edge of the first wing may be disposed forward of a leading edge of the second wing in a direction defined with respect to the front and rear of the aircraft.

The first wing and the second wing may be disposed at the same longitudinal position with respect to the front and rear of the aircraft.

At least a portion of the first wing may be retractable into the fuselage and at least a portion of the second wing may be retractable into the fuselage. Furthermore, the wing panels of the first wing and the wing panels of the second wing may be retractable into the fuselage such that at least a portion of the first wing overlies at least a portion of the second wing.

The aircraft may also include a first collapsible spar assembly for moving the first wing between the extended position and the retracted position, and a second collapsible spar assembly for moving the second wing between the extended position and the retracted position. Furthermore, the aircraft may include a first spar assembly that connects at least one of the wing panels of the first wing to the fuselage for providing structural support to the first wing, where the spar assembly has a plurality of lengths that are pivotally connected to one another. Similarly, the aircraft may include a second spar assembly that connects at least one of the wing panels of the second wing to the fuselage for providing structural support to the second wing, where the second spar assembly has a plurality of lengths that are pivotally connected to one another. In this configuration, the first spar assembly and the second spar assembly move the first wing and the second wing, respectively, between the extended position and the retracted position.

BRIEF DESCRIPTION OF THE DRAWINGS

The description herein makes reference to the accompanying drawings wherein like referenced numerals refer to like parts throughout several views and wherein.

DETAILED DESCRIPTION

Figure 1:
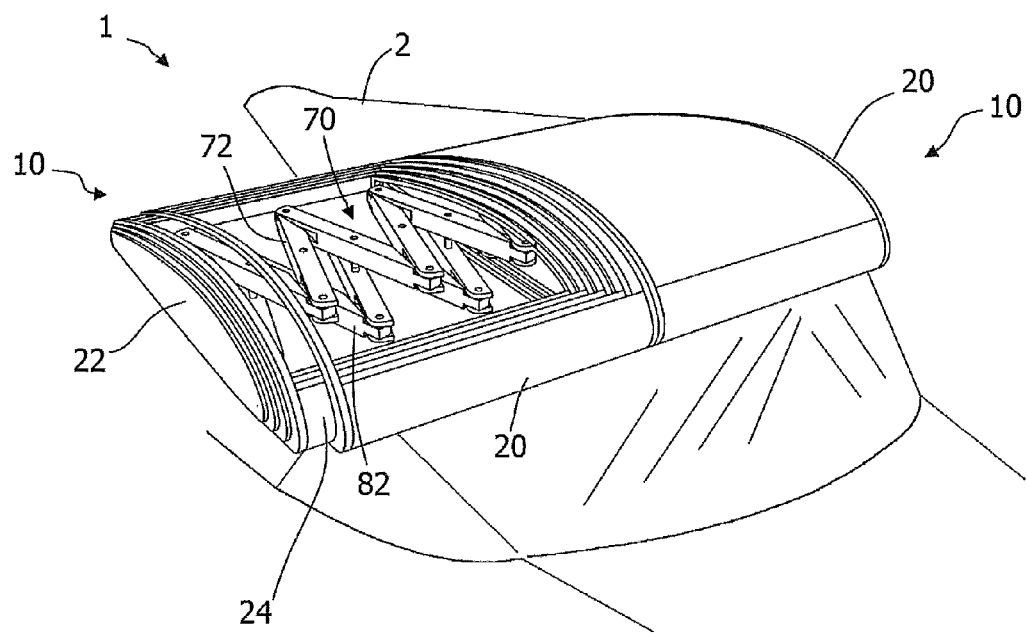
FIG. 1 is a perspective view showing an aircraft having a telescopic wing according to the invention, wherein the telescopic wing is in a retracted position.

Referring to the drawings, the invention will be seen to most generally comprise a telescopic aircraft wing having an articulated structural spar that connects a tip portion of the aircraft wing to a root portion of the aircraft wing for telescopic retraction of the tip portion into the root portion.

As shown in FIG. 1, a telescopic wing 10 according to a first embodiment of the invention moves between an extended position, to allow the telescopic wing 10 may be used as a flying surface, and a retracted position, to allow for storage of the telescopic wing 10. In particular, a pair of the telescopic wings 10 may be connected to the fuselage 2 of an aircraft 1 in a side-by-side configuration for use as the primary flying surfaces of the aircraft 1. It is particularly contemplated that the telescopic wing 10 is applicable to aircraft 1 that are designed to be convertible for use either as an airplane or as a road-worthy surface vehicle. However, it should be understood that the invention is not limited to any particular application. On the contrary, the telescopic wing 10 may be utilized in conjunction with any aircraft 1 where wings that are moveable to a retracted position for storage are needed.

As primary components, the telescopic wing 10 includes a spar assembly 70 and a plurality of telescopically related portions, or wing panels 20, 22, 24. In particular, the telescopic wing 10 includes a root panel 20, a tip panel 22, and one or more intermediate panels 24. The spar assembly 70 connects the tip panel 22 to either the root panel 20 or directly to the fuselage 2 of the aircraft 1. The spar assembly 70 is an articulated assembly that serves as the primary structural member of the telescopic wing 10, and is operable to move to the telescopic wing 10 to between the extended and retracted positions thereof.

Figure 2:
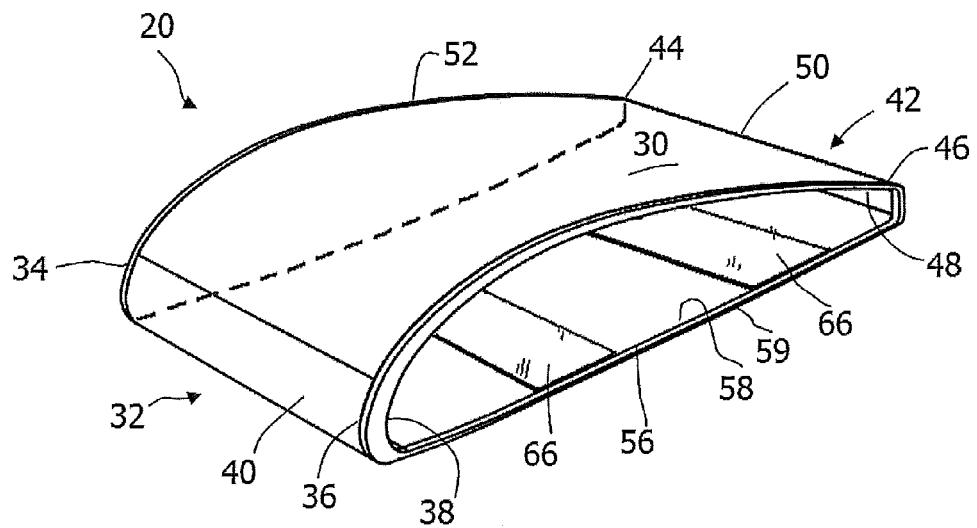
FIG. 2 is a perspective view of a root panel of the telescopic wing according to the invention.

The root panel 20, the tip panel 22, and the intermediate panels 24 cooperate to form the flying surface of the telescopic wing 10, and are similar to one another in construction. Thus the wing panels 20, 22, 24 will be described concurrently, with reference to FIG. 2, which shows the root panel 20. Except as otherwise noted, the wing panels 20, 22, 24 are identical to one another in all relevant details.

Figure 5:
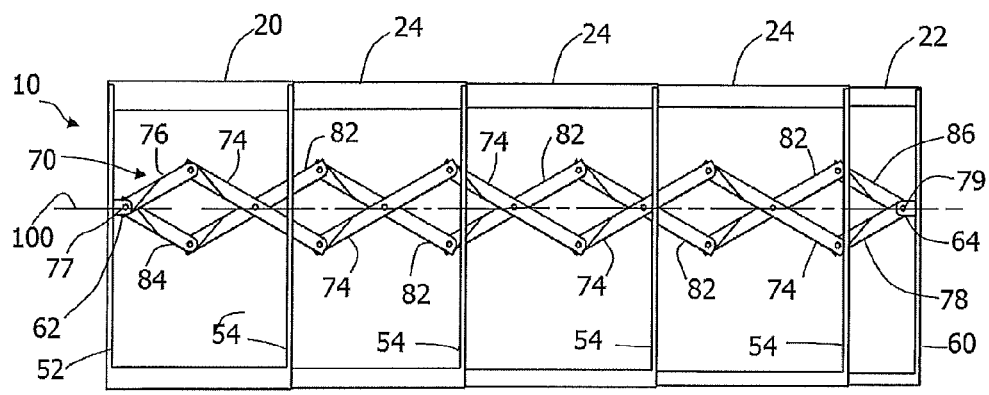
FIG. 5 is a cutaway top view of the telescopic wing of the invention, wherein the telescopic wing is in an intermediate position.

The wing panels 20, 22, 24 are substantially hollow reinforced shell structures that may be designed with either constant or variable wall thickness, as required for the particular application. A leading edge member 32 and a trailing edge member 42 serve as the primary longitudinal structural elements of each wing panel 20, 22, 24. As primary transverse structural members, each of the wing panels 20, 22, 24, is provided with an inboard capping rib 52 and an outboard capping rib 56, with the exception that the tip panel 24 has a tip capping rib 60, as seen in FIG. 5, in lieu of the outboard capping rib 56. The flight surface of the telescopic wing 10 is formed by a skin 30 provided on each of the wing panels 20, 22, 24.

The skin 30 is disposed around the exterior periphery of each of the wing panels 20, 22, 24 to serve as a flying surface when the telescopic wing 10 is in the extended position. The skin 30 forms both the upper and lower exterior surfaces of each of the wing panels 20, 22, 24, and may be fabricated from either a rigid material or a flexible material, as is well known in the art.

The leading edge member 32 and the trailing edge member 42 are located at the front and rear edges, respectively, of each wing panel 20, 22, 24 to support and provide rigidity to the skin 30. The skin 30 extends from the leading edge member 32 to the trailing edge member 42 on both the upper and lower surfaces of each wing panel 20, 22, 24. The leading edge member 32 defines a substantially convex front exterior surface 40 and a substantially concave front interior surface 38 of each wing panel 20, 22, 24. In similar fashion, the trailing edge member 42 defines a rear interior surface 48 and a rear interior surface 50 of each wing panel 20, 22, 24. With respect to the longitudinal direction of the telescopic wing 10, the leading edge member 32 and the trailing edge member 42 of each of the wing panels 20, 22, both extend from the inboard capping rib 52 to the outboard capping rib 56. Similarly, the leading edge member 32 and the trailing edge member 42 of the tip panel 24 both extend from the inboard capping rib 52 to the tip capping rib 60. The leading edge member 32 and the trailing edge member 42 of each of the wing panels 20, 22, 24 may extend substantially parallel to one another, resulting in a stepped planform for the telescopic wing 10. It should be understood, however, that the invention is not limited in this manner, and the leading edge member 32 and the trailing edge member 42 could extend at angles with respect to one another, resulting in a tapered planform for the telescopic wing 10.

The inboard capping rib 52 and the outboard capping rib 56 serve to enhance the rigidity of the wing panels 20, 22, 24. Along with the leading edge member 32 and the trailing edge member 42, the skin 30 of each of the wing panels 20, 22, 24 is connected to both the inboard capping rib 52 and the outboard capping rib 56 around the periphery thereof. The inboard capping rib 52 of each of the wing panels 20, 22, 24 may be provided with apertures or openings as needed, as will be described herein. Also, the inboard capping rib 52 of each of the intermediate panels 24 and the tip panel 24 may be provided with a lip or a plurality of tabs (not shown) that engage the outboard capping rib of the adjacent inboard panel 20, 24 to prevent the panel 22, 24 from slipping out of the adjacent inboard panel 20, 24 and to induce transfer motion to the adjacent inboard panel 24 when the telescopic wing 10 moves toward the extended position.

The outboard capping rib 56 of each of the root panel 20 and the intermediate panels 22 is adapted to allow an adjacent one of the intermediate panels 24 to pass through it telescopically. Thus, the outboard capping rib 56 of each of the root panel 20 and the intermediate panels 22 has an inner periphery 58 that defines an opening through the outboard capping rib 56 sized according to the adjacent intermediate panel 24, and an outer periphery 59 that roughly follows the geometry of the skin 30, the interior leading edge surface 38 and the interior trailing edge surface 48. Of course, the width of each outboard capping rib 56, as measured between the inner periphery 58 and outer periphery 59 thereof, will vary according to the structural design requirements of the telescopic wing 10, and is directly related to the relative sizes of adjacent wing panels 20, 22, 24.

Additional structural elements (not shown) may be provided both longitudinally between the inboard capping rib 52 and the outboard capping rib 56, as well as transversely from the leading edge member 32 to the trailing edge member 42 as required to provide sufficient strength to each of the wing panels 20, 22, 24 according to the structural design requirements of the telescopic wing 10. Also, sliding surfaces 66 and guide channels (not shown) may be provided in a complementary fashion on the interior and exterior of the skin 30 of adjacent panels of the root panel 20, the tip panel 22, and the intermediate panels 24 to allow from smooth telescopic motion of the panels 20, 22, 24 with respect to one another.

Figure 3:
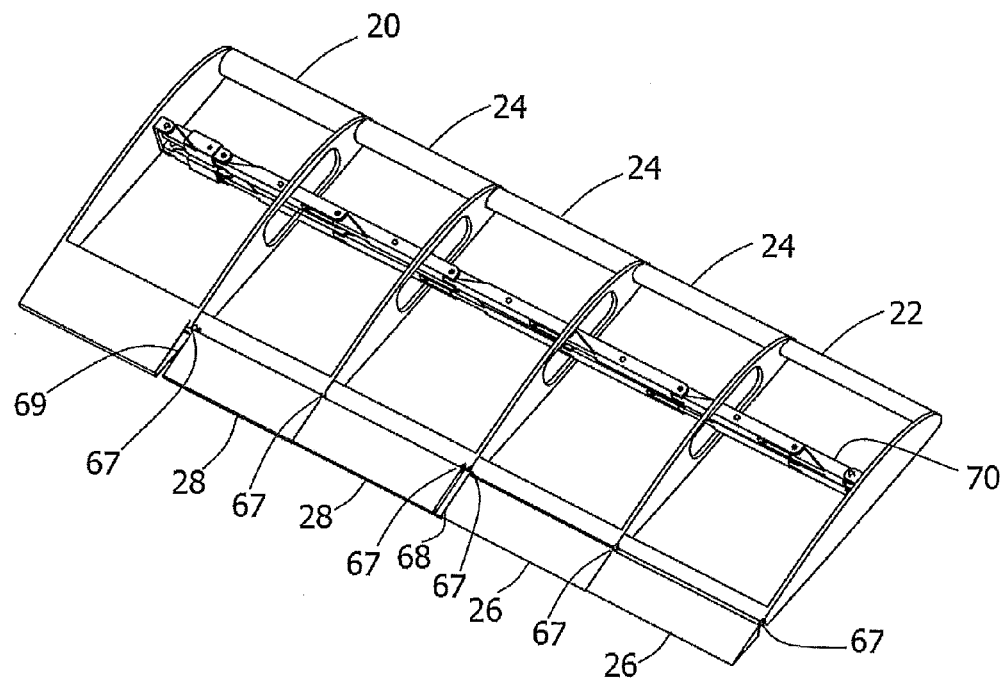
FIG. 3 is a perspective view of the telescopic wing according to the invention showing the ailerons and flaps thereof, wherein the telescopic wing is in an extended position.

The telescopic wing 10 may be provided with control surfaces that are telescopically related to one another while retaining their functionality. In particular, one or more aileron panels 26 may be hingedly connected to the tip panel 22 as well as to one or more of the intermediate panels 24, and one or more flap panels 28 may be hingedly connected to one or more of the intermediate panels 24, as shown in FIG. 3. The aileron panels 26 and the flap panels 28 are substantially hollow reinforced shell structures that are substantially similar in construction to the wing panels 20, 22, 24, and are generally the same length as the respective one of the wing panels 20, 22, 24 to which they are attached. The aileron panels 26 and the flap panels 28 differ from the wing panels 20, 22, 24 in that they are hingedly connected to the trailing edges of either the tip panel 22 or the intermediate panels 24. In this regard it is noted that all of the aileron panels 26 move together, as do all of the flap panels 28. However, it should be understood that the aileron panels 26 and the flap panels 28 pivot independently of one another with respect to the wing panels 20, 22, 24.

One of the aileron panels 26 is connected to the tip panel 22 at the trailing edge thereof, and additional aileron panels 26 may optionally be situated at the trailing edges of one or more of the intermediate panels 24. In order to hingedly connect the aileron panels 26 to the wing panels 22, 24, a hinge 67 is provided near the outboard edge of each aileron panel 26, and the hinges 67 are each mounted to the trailing edge of a respective wing panel 22, 24 at or near the most outboard point thereon. By placing the hinges 67 only at the outboard edges of the aileron panels 26, mechanical interference between the hinges 67 and further inboard ones of the aileron panels 26 is avoided, except by the width of the hinge itself, which cannot telescopically slide into the adjacent aileron panel 26.

Figure 4:
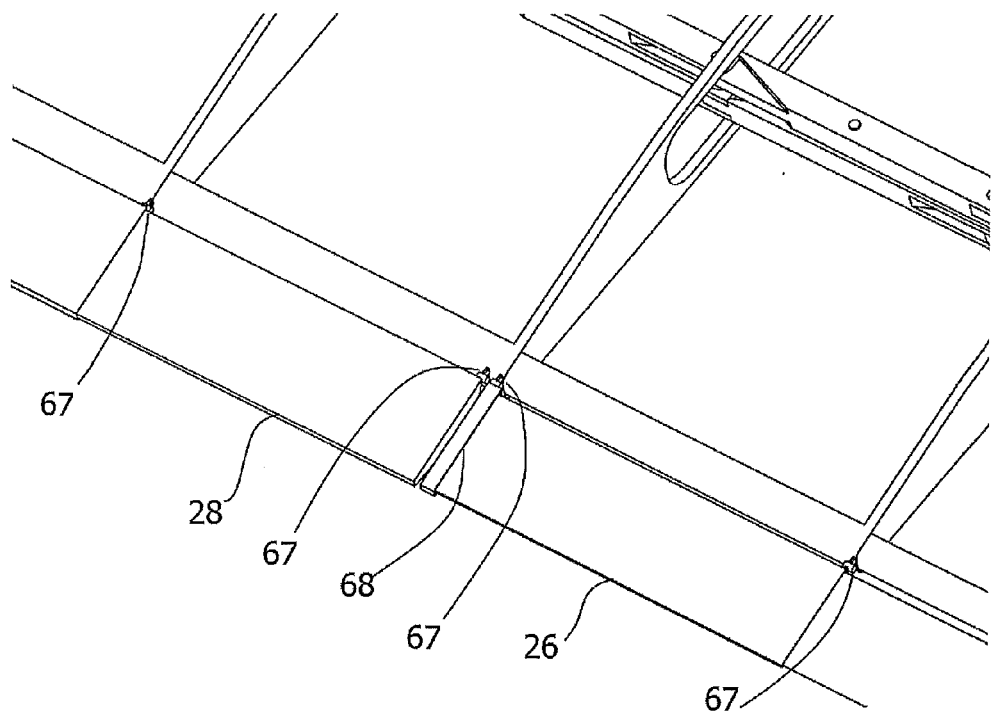
FIG. 4 is a detail view showing an aileron hinge sleeve of the telescopic wing according to the invention.

With respect to all of the aileron panels 26 except for the most inboard thereof, the inboard edges of the aileron panels 26 remain seated in an adjacent aileron panel 26. However, since the aileron panels 26 pivot with respect to the flap panels 28, the most inboard aileron panel 26 cannot remain seated in the adjacent flap panel 28 when the telescopic wing is in the extended position. Thus, an aileron hinge sleeve 68 is provided on the intermediate panel 24 immediately inboard of the intermediate panel 24 to which the most inboard aileron panel 26 is connected, as shown in FIG. 4. The aileron hinge sleeve 68 is connected to the appropriate one of the intermediate panels 24 by one of the hinges 67, and the inboard most aileron panel 26 is slidably disposed within the aileron hinge sleeve 68. Thus, when the telescopic wing 10 moves from the extended position to the retracted position, the inboard most aileron panel 26 slides through the aileron hinge sleeve 68, and slides telescopically into the outboard most flap panel 28.

The outboard most flap panel 28 is connected to a respective intermediate panel 24 by one of the hinges 67, which is connected to the trailing edge of the respective intermediate panel 24 adjacent to and immediately inboard of the hinge 67 that supports the aileron hinge sleeve 68. Thus, the outboard most flap panel 28 is slightly shorter than the intermediate panel 24 to which it is attached. Further inboard flap panels 28 are each connected to a respective intermediate panel 24 at the most outboard point thereon by one of the hinges 67. As explained with regard to the aileron panels 26, each flap panel 28 except for the one furthest inboard is telescopically receivable in the flap panel 28 that is directly inboard of it, and this telescopic relationship is at least partially maintained in the extended position so that the flap panels 28 pivot in unison. The most inboard one of the flap panels 28 is also connected to the corresponding intermediate panel 24 by one of the hinges 67 at the inboard edge thereof. Thus, the inboard most flap panel 28 is shorter than the other flap panels 28, as its length is equivalent to the exposed portion of the intermediate panel 24 to which it is attached, rather than the entire length thereof. However, the inboard hinge 67 on the inboard most flap panel 28 does not cause mechanical interference when retracting, as a recess 69 is provided in the root panel 20, wherein the recess 69 is dimensioned to allow the inboard most flap panel 28 to telescopically slide therein without blocking motion of the inboard hinge 67. Stated another way, the root panel 20 is dimensioned such that the inner periphery 58 of the outboard capping rib 56 of the root panel 20 is large enough to allow the adjacent intermediate panel 24 and the flap panel 28 to slide in together, and this additional portion of the interior of the root panel 20 as compared to the adjacent intermediate panel 24 is referred to as the recess 69.

In order to provide an articulated structural member for the telescopic wing 10 that is operable to both support the wing 10 as well as to move the wing 10 between the extended and retracted positions thereof, the spar assembly 70 connects the root panel 20 to the tip panel 22. The spar assembly 70, by way of its connection to the root panel 20 and the tip panel 22, moves in concert with the telescopic wing 10 between the extended and retracted positions of the telescopic wing 10, thus defining corresponding extended and retracted positions for the spar assembly 70.

Figure 6:
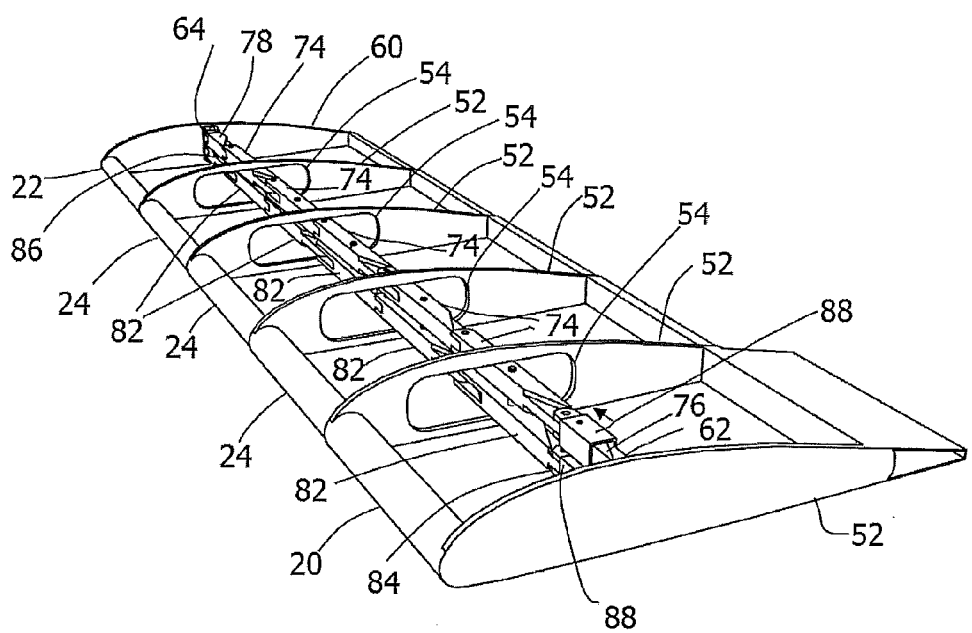
FIG. 6 is a cutaway perspective view of the telescopic wing of the invention, wherein the telescopic wing is in the extended position.

As shown in FIG. 5, wherein the telescopic wing 10 is depicted in an intermediate position, the spar assembly 70 extends and retracts either along or parallel to an extension path or extension axis 10a of the telescopic wing 10. The extension axis 10a extends from the inboard capping rib 52 of the root panel 20 to the tip capping rib 60 of the tip panel 22. When the telescopic wing 10 includes a single spar assembly 70, as opposed to multiple spar assemblies 70, the extension axis 10a may be defined as extending between a root joint 62 and a tip joint 64 that serve to connect the spar assembly 70 to the root panel 20 and the tip panel 22, respectively. The root joint 62 is a bracket or similar structure that is pivotally connected to the spar assembly 70 and is connected either to the inboard capping rib 52 of the root panel 20 or to the fuselage 2 of the aircraft 1 or another structural component of the aircraft 1. The tip joint 64 is disposed upon the tip capping rib 60 of the tip panel 22 and is pivotally connected to the spar assembly 70. As shown in FIG. 6, wherein the telescopic wing 10 is depicted in the extended position, the inboard capping rib 52 of each of the intermediate panels 24 includes a spar opening 54 that provides sufficient clearance for the spar 70 to extend therethrough in both the extended and retracted positions thereof. Each spar opening 54 may be sized so that its periphery is engageable with the spar assembly 70, so that the spar assembly 70 may provide additional support to the intermediate panels 24 of the telescopic wing 10. It should also be understood that a spar opening 54 could be provided in the inboard capping rib 52 if the root joint 62 is connected to the fuselage 2 or some other portion of the aircraft 1.

In order to provide articulated motion between the extended position and the retracted position, the spar assembly 70 includes a plurality of links arranged in a scissor-like configuration. More particularly, a first or upper portion of the spar assembly 70 includes a plurality of upper spar links 74, as well as an upper spar root joint link 76 and an upper spar tip joint link 78. The spar assembly 70 further includes a second or lower portion having a plurality of lower spar links 82, as well as a lower spar root joint link 84 and a lower spar tip joint link 86. The upper spar links 74 are connected to one another in an end-to-end manner, such that adjacent links of the upper spar links 74 are pivotal with respect to one another and vertically aligned with one another. The upper spar root joint link 76 and the upper spar tip joint link 78 are connected to respective ones of the upper spar links 74 in like manner. Similarly, the lower spar links 82 are pivotally connected to one another in end-to-end fashion and vertically aligned with one another, and the lower spar root joint link 84 and the lower spar tip joint link 86 are connected to respective ones of the lower spar links 82 in a pivotal manner as well. Furthermore, each of the upper spar links 74 is pivotally connected to a respective one of the lower spar links 82 at an intermediate location along the length thereof, as will be described in detail herein. When the spar assembly 70 is in the extended position, as seen in FIG. 6, the upper spar links 74 substantially overlie the lower spar links 82, and both the upper spar links 74 and the lower spar links 82 extend substantially parallel to the extension axis 10a of the telescopic wing 10. When the spar assembly 70 is in the retracted position, as seen in FIG. 1, adjacent pairs of the upper spar links 74 form acute interior angles with respect to one another, and likewise, adjacent pairs of the lower spar links 82 form acute interior angles with respect to one another. However, although the upper spar links 74 and the lower spar links 82 are described as extending substantially parallel to the extension axis 10a when the telescopic wing 10 is in the extended position, this need not be the case, for example, if curved links 74, 82 are provided or if links 74, 82 having non-equal lengths are provided, in which case the links 74, 82 may lie along a non-straight extension path 10a, such as a curvilinear path, when the telescopic wing 10 is in the extended position.

In order to retain the spar assembly 70 in the extended position, the pivotal motion of adjacent ones of the upper spar link 74, the upper spar root joint link 76, the upper spar tip joint link 78, the lower spar links 82, the lower spar root joint link 84, and the lower spar tip joint link 86 with respect to one another may be restrained. This can be accomplished, for example, by providing a sleeve 88 that is disposed upon any one of the links 74, 76, 78, 82, 84, 86 of the spar assembly 70. The sleeve 88 is slidable from an unlocked position, wherein the sleeve 88 does not restrain pivotal motion between adjacent links and a locked position, wherein the sleeve 88 restrains pivot motion between adjacent links. The sleeve 88 restrains pivotal motion of adjacent links in the locked position by spanning the joint between a pair of adjacent links 74, 76, 78, 82, 84, 86. The sleeve 88 may be spring loaded so that it moves to the locked position automatically when the spar assembly 70 reaches the extended position, and the sleeve may be returned to the unlocked position manually, for example by using a cable or rod (not shown). Furthermore, it should be understood that multiple sleeves 88 may be provided in order to provide redundancy.

Figure 7:
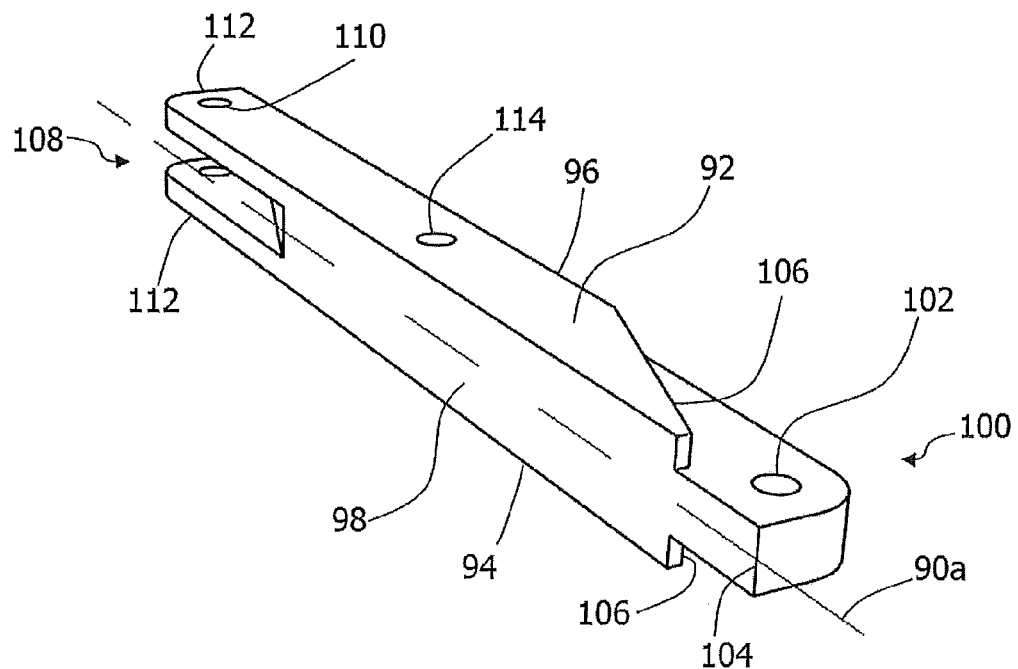
FIG. 7 is a perspective view of a first spar link.

The upper spar links 74 and the lower spar links 82 are identical to one another in all relevant details, and thus will be described concurrently, with reference to FIG. 7, which shows one of the upper spar links 74.

The spar links 74, 82 include an elongate body 90 that extends along a link axis 90a from a first joint portion 100 to a second joint portion 108 on an opposite end thereof. The elongate body 90 is either a hollow or solid structural member that is fabricated from any suitable material, but most typically from a high-strength low weight metal or composite material. The elongate body 90 may have any desired cross sectional shape, as needed in light of the structural design requirements of the telescopic wing 10. As illustrated in FIG. 7, the elongate body portion 90 has a substantially rectangular cross section that defines an upper surface 92, a lower surface 94, a first side surface 96, and a second side surface 98. Also, in order to enhance rigidity, it is contemplated that the elongate body portion may be provided with a cross-sectional shape wherein the height of the elongate body portion 90 is either equal to or greater than its width.

The first joint portion 100 and the second joint portion 108 are complementarily engaging members that connect to one another to provide pivotal motion between adjacent links 74, 82. In order to minimize the bulk of the spar assembly 70, the first joint portion 100 and the second joint portion 108 may be designed such that the upper surfaces 92 and lower surfaces 94 of adjacent links 72, 82 remain substantially aligned with respect to one another throughout the range of motion of the adjacent links 74, 82 with respect to one another. This may be done, by way of example, by providing the first joint portion 100 with a finger portion 104 having a joint aperture 102 extending through it, and by providing the second joint portion 108 with a pair of spaced furcations 112, each having a joint aperture 110 extending therethrough. The first joint portion 100 further includes a pair of inclined limit surfaces 106 that allow adjacent links 74, 82 to pivot so that they form an interior angle of less than 90° between them, and further to define the minimum interior angle that may be formed between adjacent links 74, 82 by engagement of the inclined limit surfaces 106 with the spaced furcations 112 of the second joint portion 112. Bu defining this minimum interior angle using the inclined limit surfaces 106, over-retraction of the telescopic wing 10 is prevented, and thus it is possible to avoid damage to the telescopic wing 10.

Figure 8:
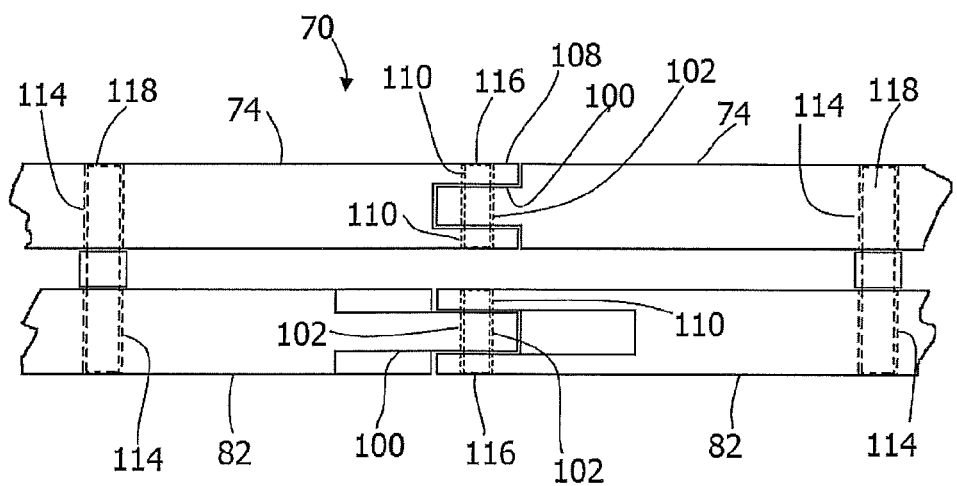
FIG. 8 is a side detail view of the spar assembly.

As shown in FIG. 8, which shows a portion of the spar assembly 70 disposed in the extended position thereof with particular emphasis on the pivotal connections between a pair of adjacent upper spar links 74 to one another as well as the pivotal connections between a pair of adjacent lower spar links 82 to one another. In order to connect adjacent pairs of the upper spar links 74, the finger portion 102 of the first joint portion 100 of one of the upper spar links 74 is received between the spaced furcations 112 of the second joint portion 108 of the other upper spar link 74 of the adjacent pair of upper spar links. The joint aperture 102 of the first joint portion 100 is aligned with the joint apertures 110 of the second joint portion 108, and the first joint portion 100 is pivotally connected to the second joint portion 108 by a joint pin 116 and appropriate fasteners (not shown). Adjacent pairs of the lower spar links 82 are connected to one another in the same manner. By connecting adjacent pairs of the upper spar links 74 and lower spar links 82 end-to-end, the upper surfaces 92 and lower surfaces 94 of adjacent pairs of links 74, 82 may be vertically aligned, and furthermore, may be substantially coplanar to one another.

In order to constrain the motion of the spar assembly 70 such that it extends along or parallel to the extension axis 10a of the telescopic wing 10, each of the upper spar links 74 is pivotally connected to a corresponding one of the lower spar links 82. In particular, each of the links 74, 82 has a pivot aperture 114 that extends through the elongate body portion 90 from the upper surface 92 to the lower surface 94 thereof. The pivot aperture 114 of each of the upper spar links 74 is aligned with respect to the pivot aperture 114 of a corresponding one of the lower spar links 82. A pivot pin 118 extends through each of the pivot apertures 114 to secure each upper spar link 74 to a corresponding lower spar link 82, and may be retained therein by appropriate fasteners (not shown). Through connection of the upper spar links 74 to one another in end-to-end fashion and the connection of the lower spar links 82 to one another in end-to-end fashion, as well as the pivotal connection of each upper spar link 74 to a respective lower spar link 82, pivotal motion of any of the joints of the spar assembly 70 at either the joint pins 116 or the pivot pins 118 is necessarily carried through the entire structure by way of corresponding pivotal movement at every other one of the joint pins 116 and pivot pins 118. Since the spar assembly 70 may be constructed such that there is minimal vertical clearance between the lower surfaces 94 of the upper spar links 74 and the upper surfaces 92 of the lower spar links 82, those surfaces may be fabricated from low-friction materials to facilitate sliding of these parts with respect to one another.

In order to connect the spar assembly 70 to the root joint 62 and the tip joint 64, the spar assembly 70 includes a plurality of joint links 76, 78, 84, 86 adapted to such purpose. In particular, in order to connect the spar assembly 70 to the root joint 62, the most inboard link of the upper spar links 74 is connected to the upper spar root joint link 76 and the most inboard of the lower spar link 82 is connected to the lower spar root joint link 84. In like manner, in order to connect the spar assembly 70 to the tip joint 64, the most outboard link of the upper spar links 74 is connected to the upper spar tip joint link 78, and the most outboard link of the lower spar links 82 is connected to the lower spar tip joint link 86. Each of the joint links 76, 78, 84, 86 is substantially similar in construction to the upper spar links 74 and the lower spar links 82 with the exception that the joint links 76, 78, 84, 86 are approximately half the length of the upper spar link 74 and the lower spar link 82. Thus, since the root joint 62, the tip joint 64, and the pivot pins 118 all lie along the extension axis 10a regardless of the degree of extension of spar assembly 70, the distance between the first joint portion 100 and second joint portion 108 of the joint links 76, 78, 84, 86 must be approximately the same distance as the distance between the joint apertures 102, 110 and the pivot aperture 114 of each of the upper spar link 74 and lower spar link 82.

It should be understood from the foregoing that by connecting the upper spar links 74 in end to end fashion at the first and second joint portions 100, 108 thereof, and by connecting the lower spar links 82 to one another in like manner, such that all of the upper spar links 74 are disposed above the lower spar links 82, and further such that the upper spar links 74 and lower spar links 82 are connected only by the pivot pins 118 at the centrally located pivot apertures 114, mechanical interference between the upper spar links 74 and the lower spar links 82 is prevented. This allows the spar assembly 70 to be disposed in the extended position, with the upper spar links 74 and the lower spar links 82 extending parallel to the extension axis 10a. In this manner, the structural rigidity of the spar assembly 70 is enhanced, thus allowing the spar assembly 70 to serve as the primary structural member of the telescopic wing 10.

As should be understood from the foregoing, the spar assembly 70 may be moved between the extended and retracted positions thereof by inducing pivotal motion of any one of the links 74, 82 with respect to any other one of the links 74, 82. Thus, in order to facilitate movement of the spar assembly 70 between the extended and retracted positions, an actuator may be provided that is capable of moving the spar assembly 70 between the extended and retracted positions.

Figure 9:
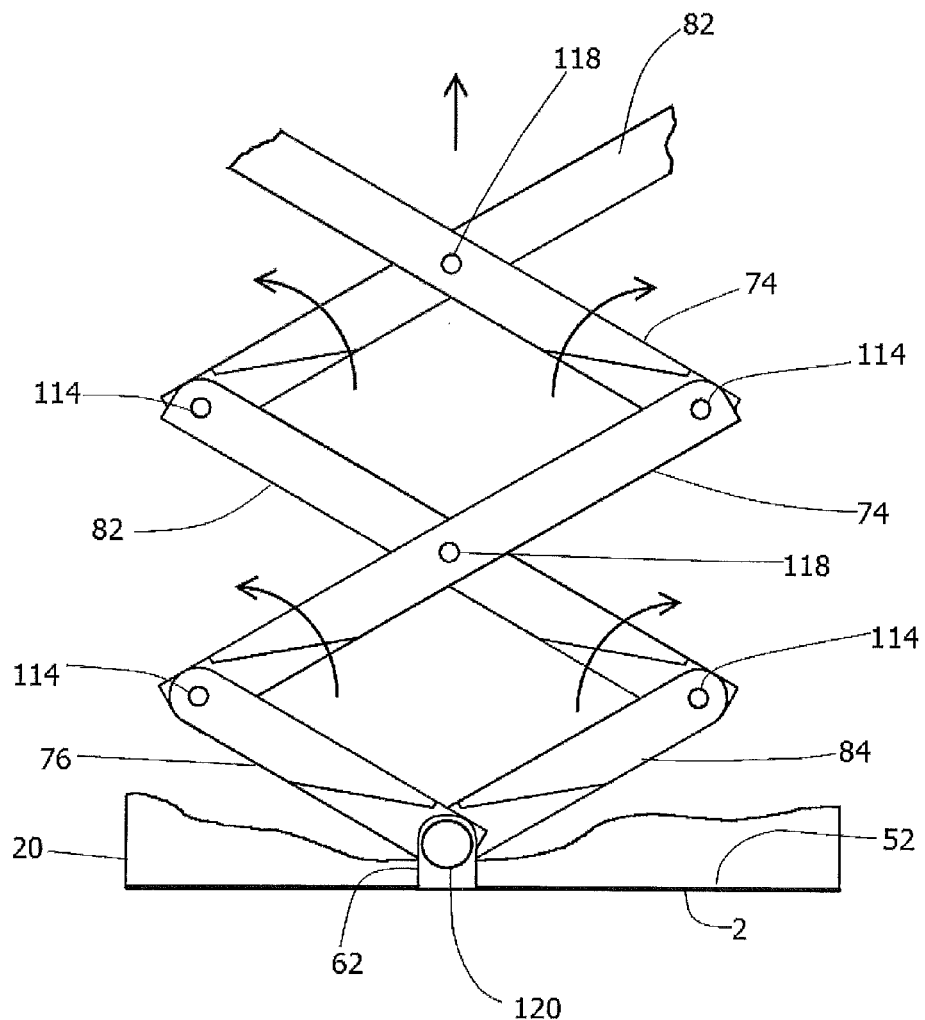
FIG. 9 is a top view of the spar assembly wherein a rotary actuator is provided.

As shown in FIG. 9, a rotary actuator 120 may be provided at the root joint 62 to pivot either of the upper spar root joint link 74 or the lower spar root joint link 82 with respect to the root joint 62. The rotary actuator 120 may be a motor, crank, or other device operable to apply a rotational force to at least one of the joints 74, 82. Furthermore, multiple rotary actuators 120 may be provided as needed, and rotary actuators 120 may be positioned anywhere along the spar assembly 70, not just at the root joint 62.

Figure 10:
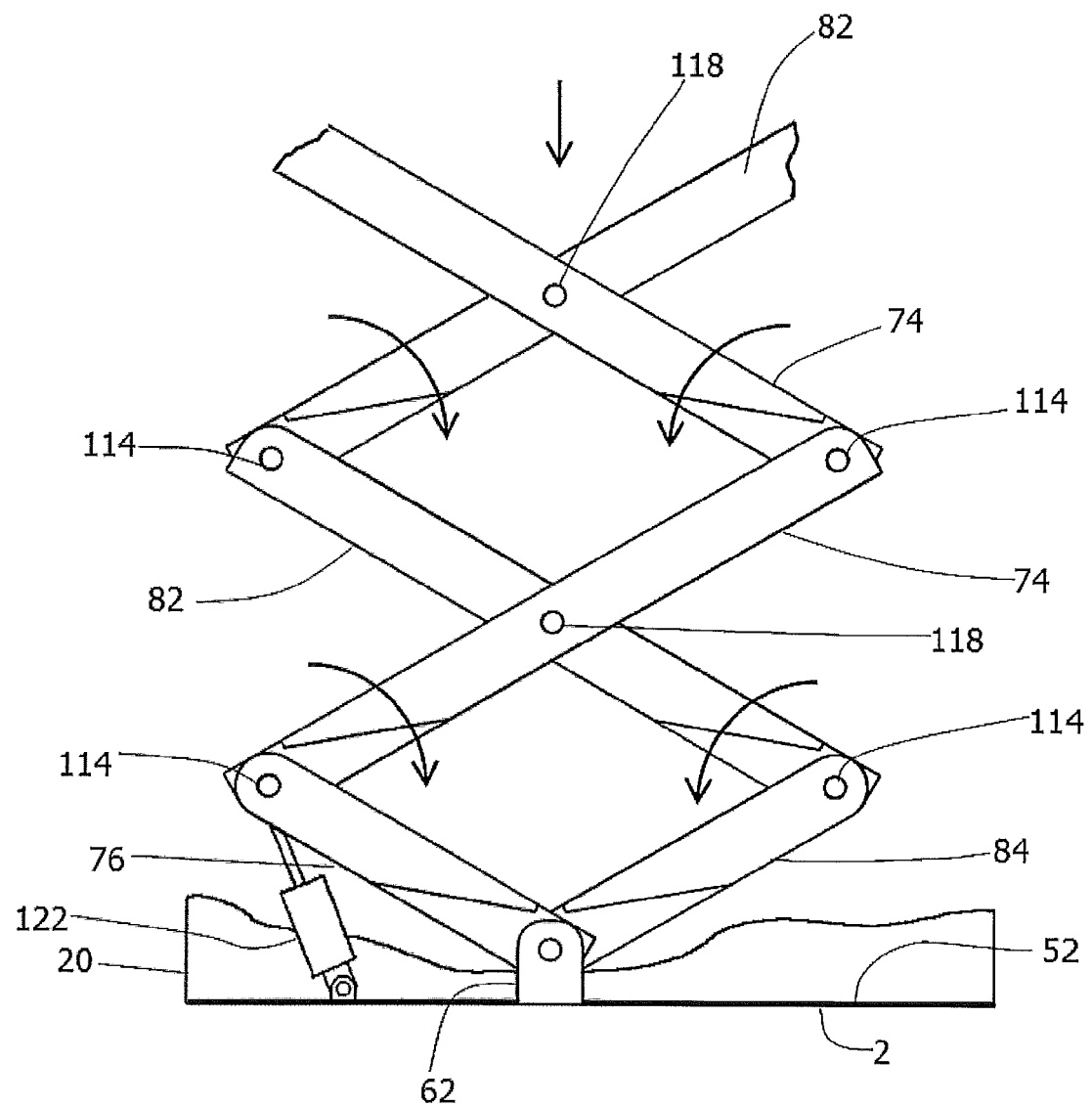
FIG. 10 is a top view of the spar assembly wherein a linear actuator is provided.

As shown in FIG. 10, a linear actuator 122, such as a hydraulic or pneumatic piston and cylinder assembly, may be provided having one end in engagement with the spar assembly 70, and the other end in engagement with the fuselage 2 of the airplane or the inboard capping rib 52 of the root panel 20. Thus, extension or retraction of the linear actuator 122 is operable to cause a corresponding extension or retraction of the spar assembly 70. However, it should be understood that the linear actuator 122 could be positioned in numerous other ways that would render it operable to perform this function, for example, by connecting the ends of the linear actuator 122 to two different locations on the spar assembly 70, wherein the ends of the linear actuator 122 are connected to different links 74, 76, 78, 82, 84, 86.

In use, a user may move the telescopic wing 10 between the extended and retracted positions thereof for alternatively using the telescopic wing 10 as a flying surface or storing the telescopic wing 10, as desired. To move the telescopic wing 10, the user first releases the locking sleeve 88 or other locking mechanism, so that the links 74, 82 of the spar assembly are no longer restrained against pivoting with respect to one another. The user then induces pivotal motion of the links 74, 82 of the spar assembly 70, for example, by using the rotary actuator 120 or the linear actuator 122. While doing so, the wing panels 20, 22, 24 are telescopically received within adjacent inboard wing panels 20, 22, 24, until the telescopic wing 10 has reached the retracted position thereof.

The user may move the telescopic wing 10 from the retracted position to the extended position by inducing pivotal motion of the links 74, 82 of the spar assembly 70, for example, by using the rotary actuator 120 or the linear actuator 122. As the user does so, the wing panels 20, 22, 24 extend telescopically outward. When the links 74, 82 are parallel to the extension axis 10a, the telescopic wing 10 is in the extended position, and the locking sleeve 88 may be engaged to restrain the spar assembly 70 from moving toward the retracted position inadvertently.

As described in connection with the first embodiment, the upper spark links 74 and the lower spar links 82 of the spar assembly are provided with minimal vertical clearance between them. However, in a second embodiment, it is particularly contemplated that vertical clearance may be provided between the upper spar links 74 and the lower spar links 82.

Figure 11:
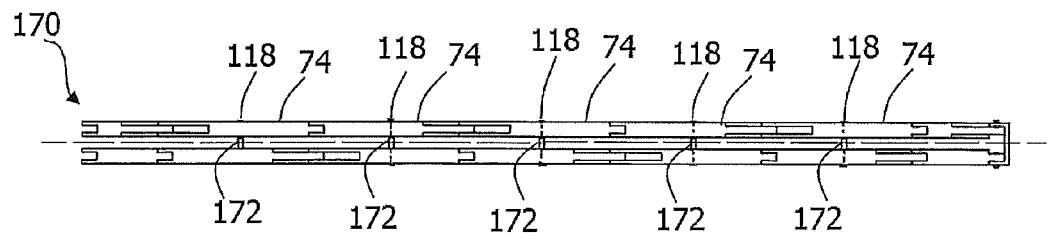
FIG. 11 is a side view of a spar assembly according to a second embodiment where spacers are disposed between the upper spar links and the lower spar links.
Figure 12:
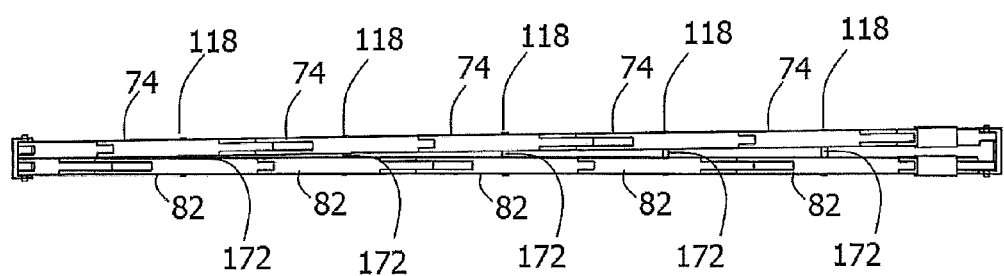
FIG. 12 is a side view of the spar assembly according to the second embodiment where variable height spacers are disposed between the upper spar links and the lower spar links to provide a tapered profile for the spar assembly.

As shown in FIG. 11, the telescopic wing 10 may be provided with a spar assembly 170 wherein spacers 172 are disposed on the pivot pins 118 between the upper spar links 74 and corresponding lower spar links 82 to vertically space the upper spar links 82 with respect to the lower spar links 74. The spacers may be formed of any suitable material, such as low-friction materials, and by way of example, the spacers 82 could be bushings formed from metals or plastics. The spacers 172 may be uniform in length, such that the upper spar links 74 of the spar assembly 170 would extend substantially parallel to the lower spar links 82, or the spacers 172 could be of varying lengths, for example, to provide a taper between the upper spar links 74 and the lower spar links 82, as shown in FIG. 12. The lengths of the spacers 172 are determined according to the structural design criteria of the telescopic wing 10. Alternatively, it should be understood that relatively short spacers 172 formed from low-friction material could be provided to act as bushings that allow for smooth movement of the upper spar links 74 with respect to the lower spar links 82.

A user may use the telescopic wing 10 according to the second embodiment in the same manner as described in connection with the first embodiment.

Figure 13:
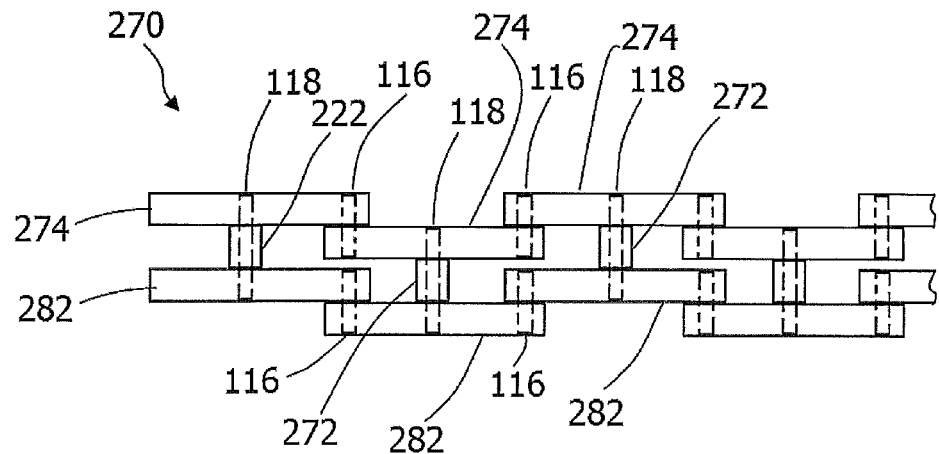
FIG. 13 is a side view of a spar assembly according to a third embodiment wherein the links are disposed in a vertically staggered configuration.
Figure 14:
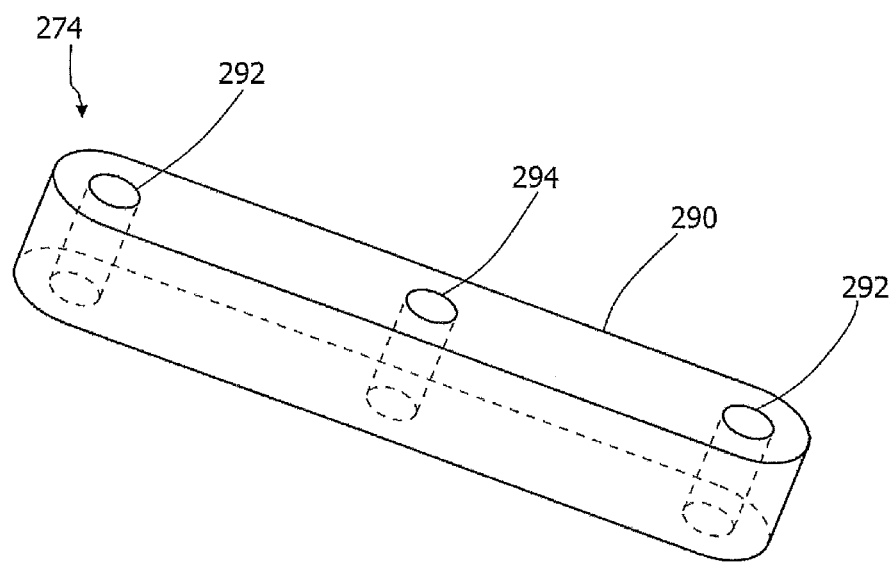
FIG. 14 is a perspective view of an upper spar link of the spar assembly of the third embodiment.

In the first embodiment, it is noted that the upper spar links 74 and the lower spar links 82 may be formed so that the upper surfaces 92 and lower surfaces 94 of adjacent pairs of links 74, 82 are aligned. However, in a third embodiment, the telescopic wing 10 is provided with a spar assembly 270, as shown in FIG. 13, wherein adjacent pairs of upper spar links 274 and adjacent pairs of lower spar links 282 are staggered with respect to one another. The links 274, 282 each have an elongate body portion 290 having a joint aperture 292 on each end thereof, and a pivot aperture 294 at an intermediate point between the joint apertures 292, as shown in FIG. 14, which shows one of the upper spar links 274 as representative of the links 274, 282. Similar to the spar assembly 170 of the second embodiment, corresponding upper spar links 274 and lower spar links 282 are vertically spaced by spacers 272. However, the spacers 272 provide vertical clearance that allows adjacent pairs of upper spar links 274 and adjacent pairs of lower spar links 282 to be stacked vertical at the joint apertures 292 thereof, and due to the staggered configuration, consecutive spacers are vertically aligned with either one of upper spar links 274 or lower spar links 282 in an alternating fashion. The joint aperture 292 of each upper spar link 274 is disposed in alignment with and either above or below the joint aperture 292 of an adjacent upper spar link 274, and the adjacent upper spar links 274 are connected to one another via joint pins 116 that extend through both links. The lower spar links 282 are connected in like manner, and thus, the spar assembly 270 has a height equal to or greater than that of four of the links 274, 282. By this structure, a rigid structural spar assembly 270 may be provided using a simplified structure for the links 274, 282.

A user may use the telescopic wing 10 according to the third embodiment in the same manner as described in connection with the first embodiment.

Figure 15:
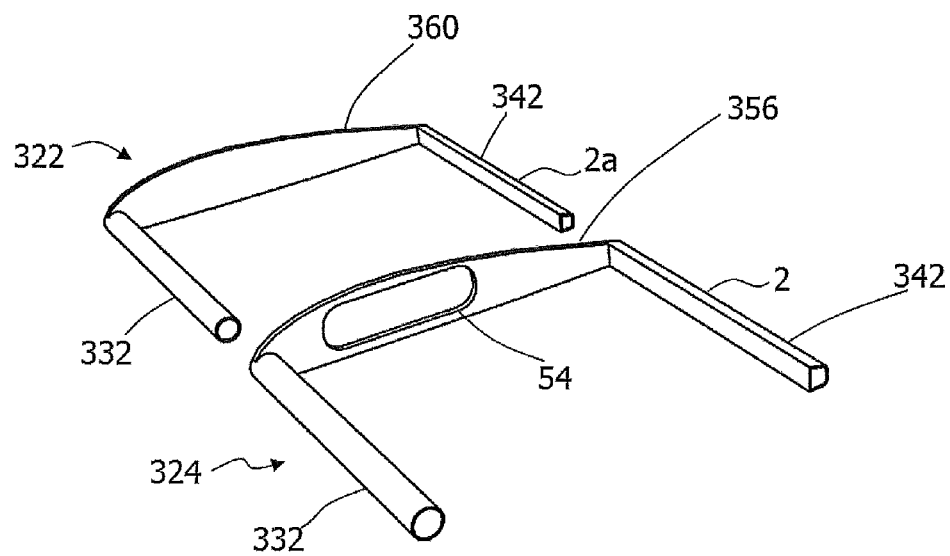
FIG. 15 is a perspective view showing a tip panel and an intermediate panel having tubular support members according to a fourth embodiment.
Figure 16:
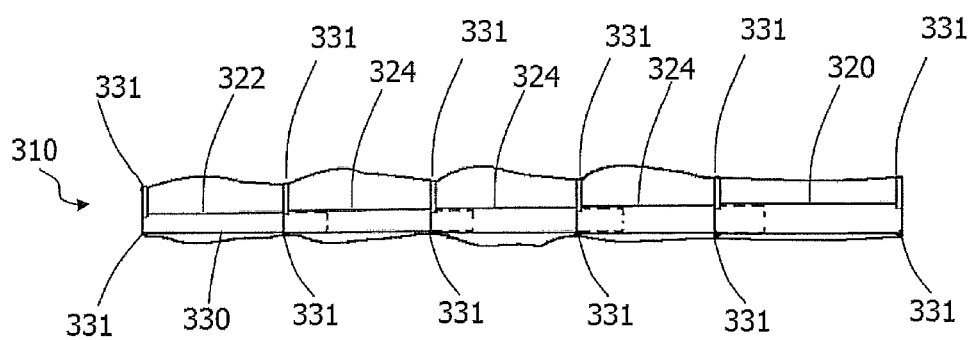
FIG. 16 is a perspective view of the telescopic wing according to the fourth embodiment.

In a fourth embodiment, it is contemplated that the rigidity of the wing panels 20, 22, 24 could be improved by replacing the leading edge members with tubular structural elements. In particular, FIG. 15 shows a tip panel 322 and an intermediate panel 324 according to the fourth embodiment, wherein tubular leading edge members 332 and tubular trailing edge members are connected to a tip capping rib 360 of the tip panel 322 and to an outboard capping rib 356 of the intermediate panel 324. The outboard capping ribs 356 are constructed similarly to the inboard capping ribs 52 of the first embodiment. A root panel 320 constructed similarly to the intermediate panel 324 is also included in a telescopic wing 310, which is shown in FIG. 16, wherein the telescopic wing 310 is shown in an intermediate position. The intermediate panel 324 and the root panel 320 are constructed in the same manner as the tip panel 322, and Each tubular leading edge member 332 and tubular trailing edge member 342 of the tip panel 322 and the intermediate panels 324 are telescopically receivable in the tubular leading edge member 332 and tubular trailing edge member 342, respectively, in the adjacent inboard intermediate panel 324 or root panel 320. The root panel 320 differs from the intermediate panel 324 in that the tubular leading edge member 332 and tubular trailing edge member 342 extend from the outboard capping rib 356 to an inboard capping rib 52 constructed as in the first embodiment.

The telescopic wing 310 further includes a flexible skin 330. The flexible skin 330 is a unitary member fabricated from a suitable flexible material, such as fabric or plastic. The flexible skin 330 is only connected to each of the wing panels 320, 322, 325 at the outboard edge thereof at connection points 321, for example, on the outboard capping rib 56 of the root panel 320 and intermediate panels 324 or tip capping rib 60 of the tip panel 322. In this manner, since the flexible skin is not connected to the tubular leading edge members 332 and tubular trailing edge members 342, mechanical interference is avoided. When the telescopic wing 310 is moved to the retracted position, the skin 330 folds with respect to the wing panels 320, 322, 324.

A user may use the telescopic wing 310 according to the fourth embodiment in the same manner as described in connection with the first embodiment.

Figure 17:
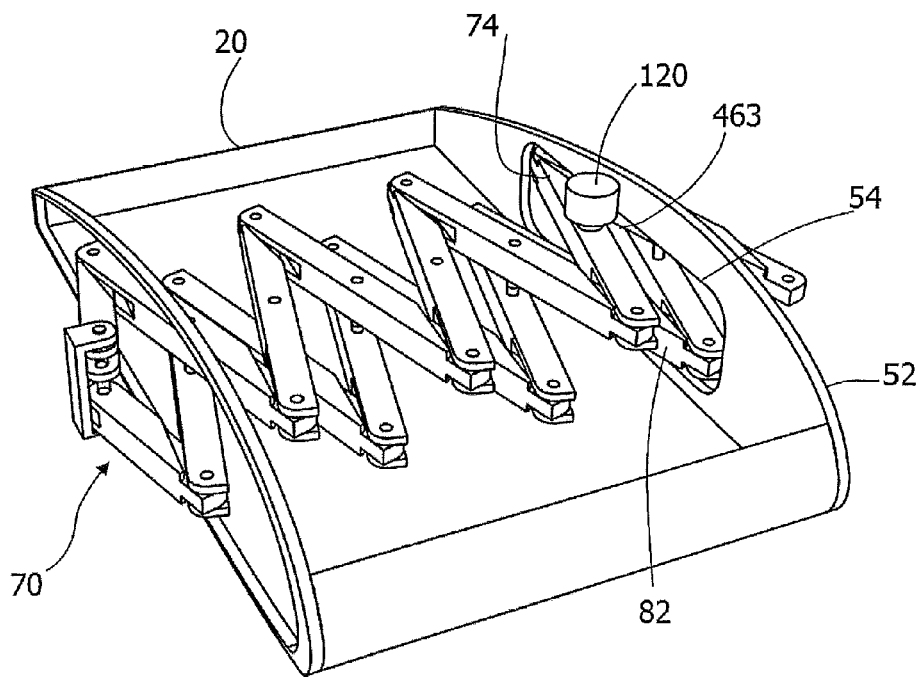
FIG. 17 is a perspective view showing a spar assembly and root portion according to a fifth embodiment.

In the first embodiment, the spar assembly 70 is described as extending from the tip panel 22 to either the root panel 20 or the fuselage 2 of the aircraft 1. However, in a fifth embodiment, it is contemplated that the spar assembly 70 could extend from the tip panel 22 of a first wing 10 to the tip panel 22 of a second wing 10. As shown in FIG. 17, the inboard capping rib 52 of the root panel 20 has a spar opening 54 formed therein, so that the spar assembly 70 may extend into the adjacent root panel 20. A connecting bracket 463 is connected to the inboard capping rib 52 of one or both root panels, and, using a pivot pin 118, connects to intermediate one of each of the upper spar links 74 and lower spar links 82 in order to secure the middle of the spar assembly 70 to the root panels 20. A rotary actuator 120 may be provided on the connecting bracket 463 to move the spar assembly 70 between the extended and retracted positions.

A user may use the telescopic wings 10 according to the fifth embodiment in the same manner as described in connection with the first embodiment.

Figure 18:
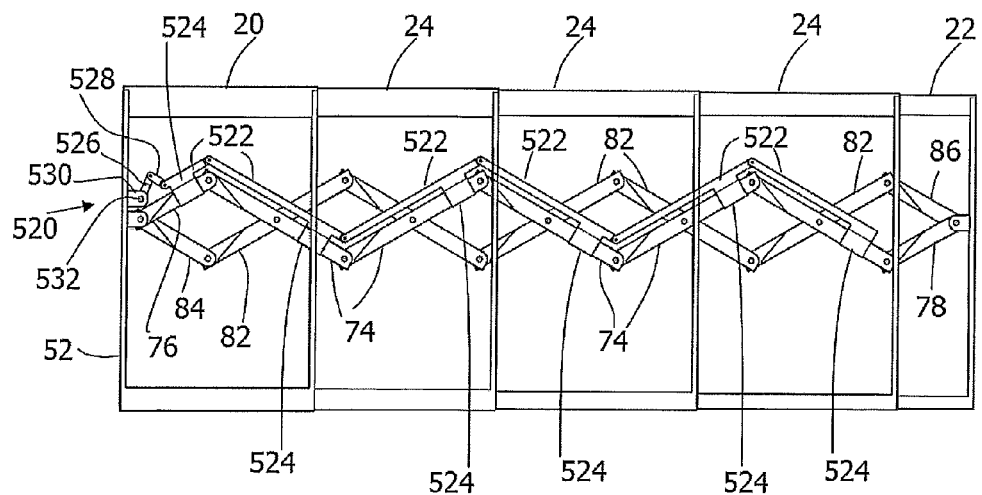
FIG. 18 is a cutaway top view of the telescopic wing having a locking assembly according to a sixth embodiment, wherein the telescopic wing is in an intermediate position.
Figure 19:
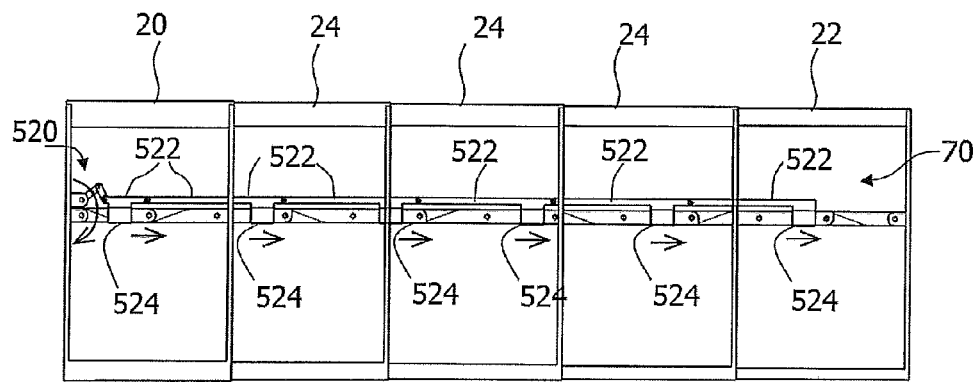
FIG. 19 is a cutaway top view of the telescopic wing having a locking assembly according to a sixth embodiment, wherein the telescopic wing is in an extended position.

In the first embodiment, it is taught that the spar assembly 70 may be provided with a locking sleeve 88 that restrains pivotal motion of adjacent pairs of the links 74, 76, 78, 82, 84, 86. However, in a sixth embodiment, it is contemplated that the telescopic wing 10 may be provided with a locking assembly 520 having a plurality of interconnected sleeves 524 may be provided, as shown in FIGS. 18-19. Each sleeve 524 is slidable from an unlocked position, wherein the sleeve 524 does not restrain pivotal motion between adjacent links and a locked position, wherein the sleeve 524 restrains pivot motion between adjacent links. As illustrated, one sleeve 524 is provided at the joints between adjacent upper spar links 74, 76, 78. However, it should be understood that sleeves 524 could also be provided for the lower spar links 74, 76, 78.

Figure 20:
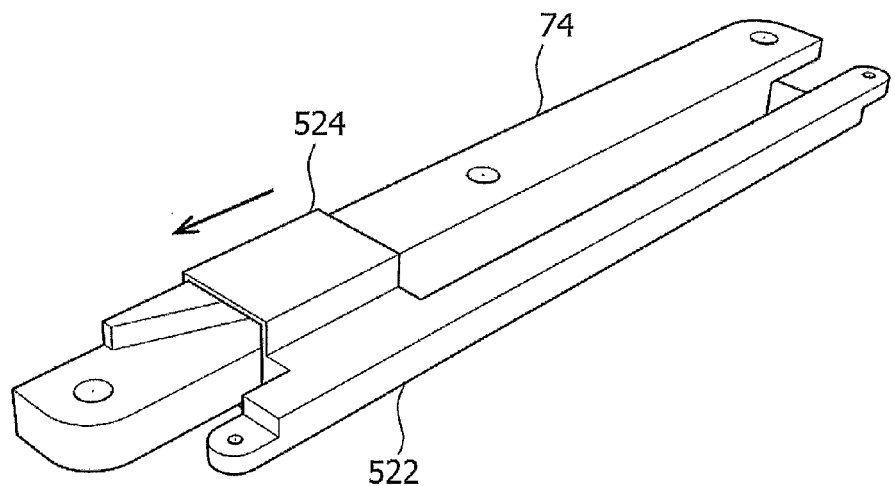
FIG. 20 is a perspective view showing a locking sleeve and connecting rod according to the sixth embodiment.

The locking assembly 520 includes a plurality of connecting rods 522. Each connecting rods 522 is either pivotally connected to or formed integrally with a respective sleeve 524, as best seen in FIG. 20. The connecting rods are pivotally connected to one another, and interconnect the sleeves 524 so that they move together between the locked and unlocked positions. The pivotal connections of the connecting rods 522 are arranged so that the locking assembly may 520 move in concert with the spar assembly 70 as the spar assembly 70 moves between the extend and retracted positions. Although the connecting rods 522 are shown disposed to the side of and vertically aligned with the links of the spar assembly 70, it should be noted that the connecting rods 522 could be located elsewhere. For example, the connecting rods 522 could be disposed above the links of the spar assembly 70.

At the inboard end of the locking assembly 520, a first pivot link 526 and a second pivot link 528 connect the inboard most connecting rod to a bracket 530 that is disposed on the inboard capping rib 54 of the root portion 20, or otherwise connected to the fuselage 2 of the aircraft 1. The first pivot link 526 is pivotally connected to the bracket 530. The second pivot link 528 is pivotally connected to both the first pivot link 528 and to one of the connecting rods 522. When the spar assembly 70 moves to the extended position, the locking assembly 520 is initially in the unlocked position, as best seen in FIG. 19, and the pivot links 526, 528 are disposed at an angle with respect to one another. An actuator 532 is disposed upon the bracket 530 and is operable to rotate the first pivot link 526 with respect to the bracket 530 to thereby force the pivot links 526, 528 into alignment with respect to one another, thereby moving the connecting rods 522 away from the bracket 530 and thus moving the sleeves 524 to the locked position. The actuator may also be used to return the sleeves 524 to the unlocked position by rotating the pivot links 526, 528 back to an angle with respect to one another. The actuator 532 may be a motor, spring, cable, piston and cylinder device, or other structure operable to induce rotational motion of the pivot links 526, 528. It should also be understood that the pivot links 526, 528 could be omitted upon by provision of an actuator 532 operable to induce linear motion of the connecting rods 522 directly.

A user may use the telescopic wing 10 according to the sixth embodiment in the same manner as described in connection with the first embodiment.

Figure 21:
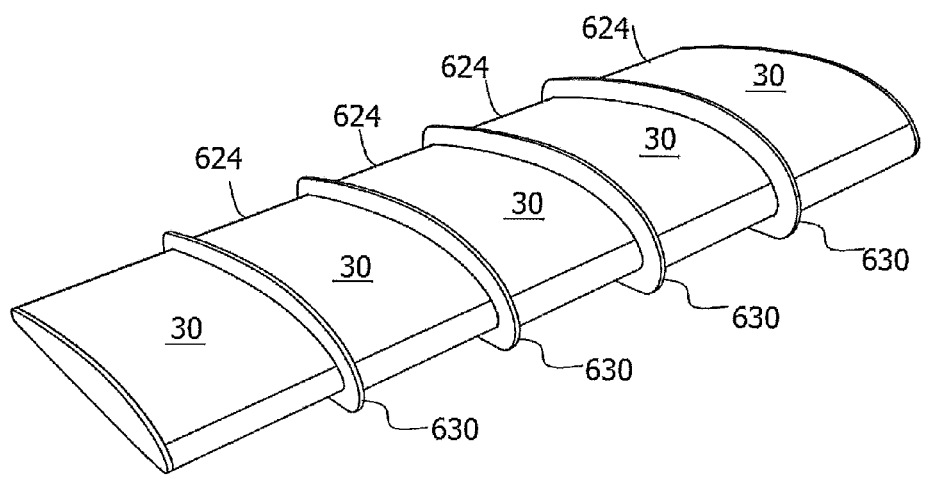
FIG. 21 is a perspective view showing a plurality of enhanced rigidity wing panels having radially extending outboard capping ribs according to a seventh embodiment.

In the first embodiment, it is taught that the outboard capping ribs 56 of the root panel 20 and the intermediate panels 24 serve to enhance the rigidity of the wing panels 20, 24. Of course, the depth of the outboard capping ribs 56 is limited, as the inner periphery 58 of each inboard capping rib 56 must be sized to accommodate the adjacent outboard wing panel 22, 24. However, in a seventh embodiment, it is contemplated that the telescopic wing 10 may be provided with enhanced rigidity wing panels 624 having radially extending outboard capping ribs 630, as seen in FIG. 21. With the exception of the outboard capping ribs 630, the wing panels 624 are identical to the wing panels 20, 24 in all relevant details, and the wing panels 624 may serve the same functions as described for the root panel 20 and the intermediate panels 24, and thus the wing panels 624 cooperate to form at least a portion of a flying surface, as described in connection with the wing panels 20, 24.

Figure 22:
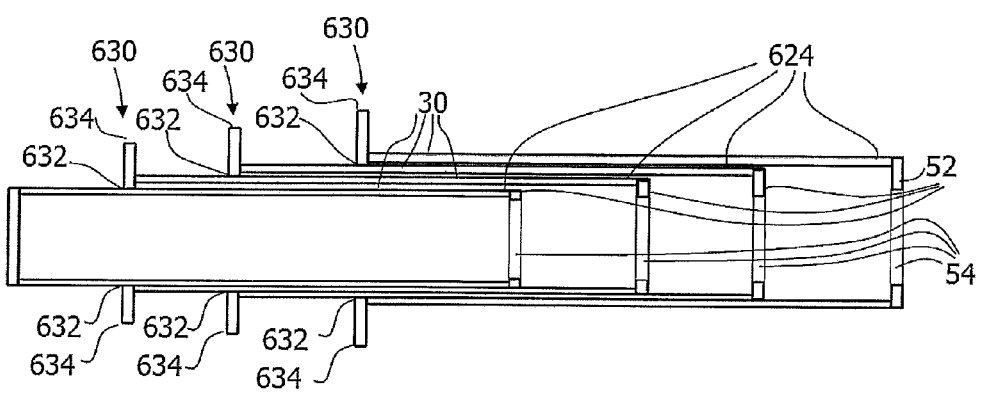
FIG. 22 is a side cross-sectional view showing the plurality of enhanced rigidity wing panels according to the seventh embodiment.

As shown FIG. 22, the outboard capping ribs 630 are connected to the skin 30 of each wing panel 624, and it should further be understood that the outboard capping ribs 630 are connected to the leading edge member 32 and the trailing edge member 42 (not shown in FIG. 22). Each outboard capping rib 630 has an inner periphery 632 that is located at or near the connection to the skin 30. Each outboard capping rib 630 extends radially outward with respect to the skin 30, to an outer periphery 634. In this manner, the depth of the outboard capping rib 630, as measured between in the inner periphery 632 and outer periphery 634, is increased, thereby enhancing the structural rigidity of the wing panels 624.

A user may use the telescopic wing 10 according to the seventh embodiment in the same manner as described in connection with the first embodiment.

Figure 23:
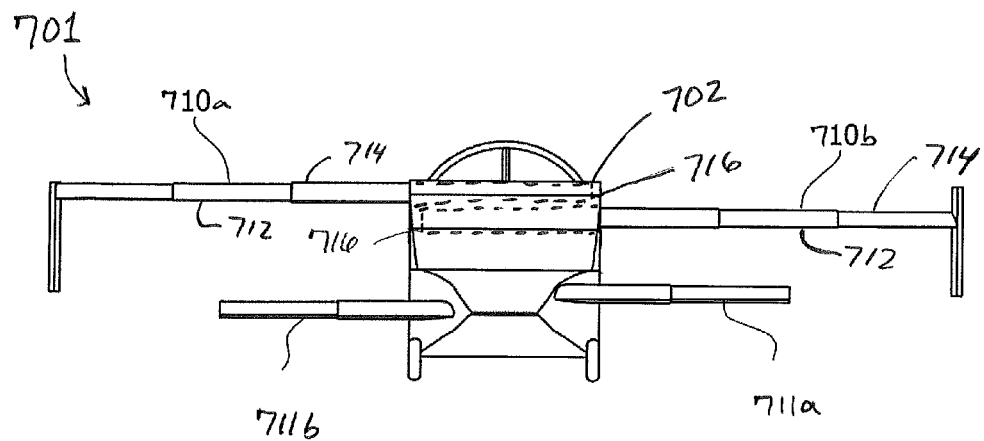
FIG. 23 is a front view of an aircraft having elevationally offset telescopic wings.
Figure 24:
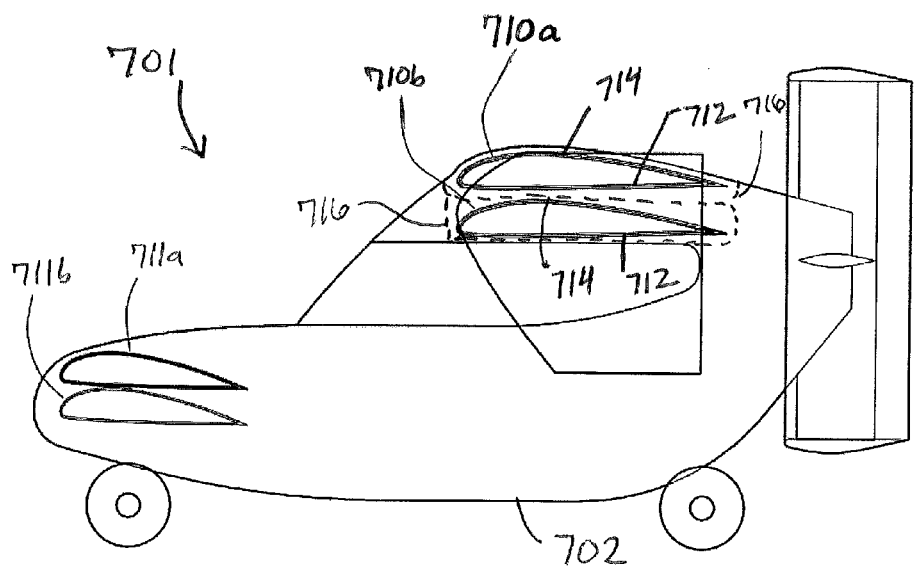
FIG. 24 is a side view of an aircraft having elevationally offset telescopic wings.
Figure 27:
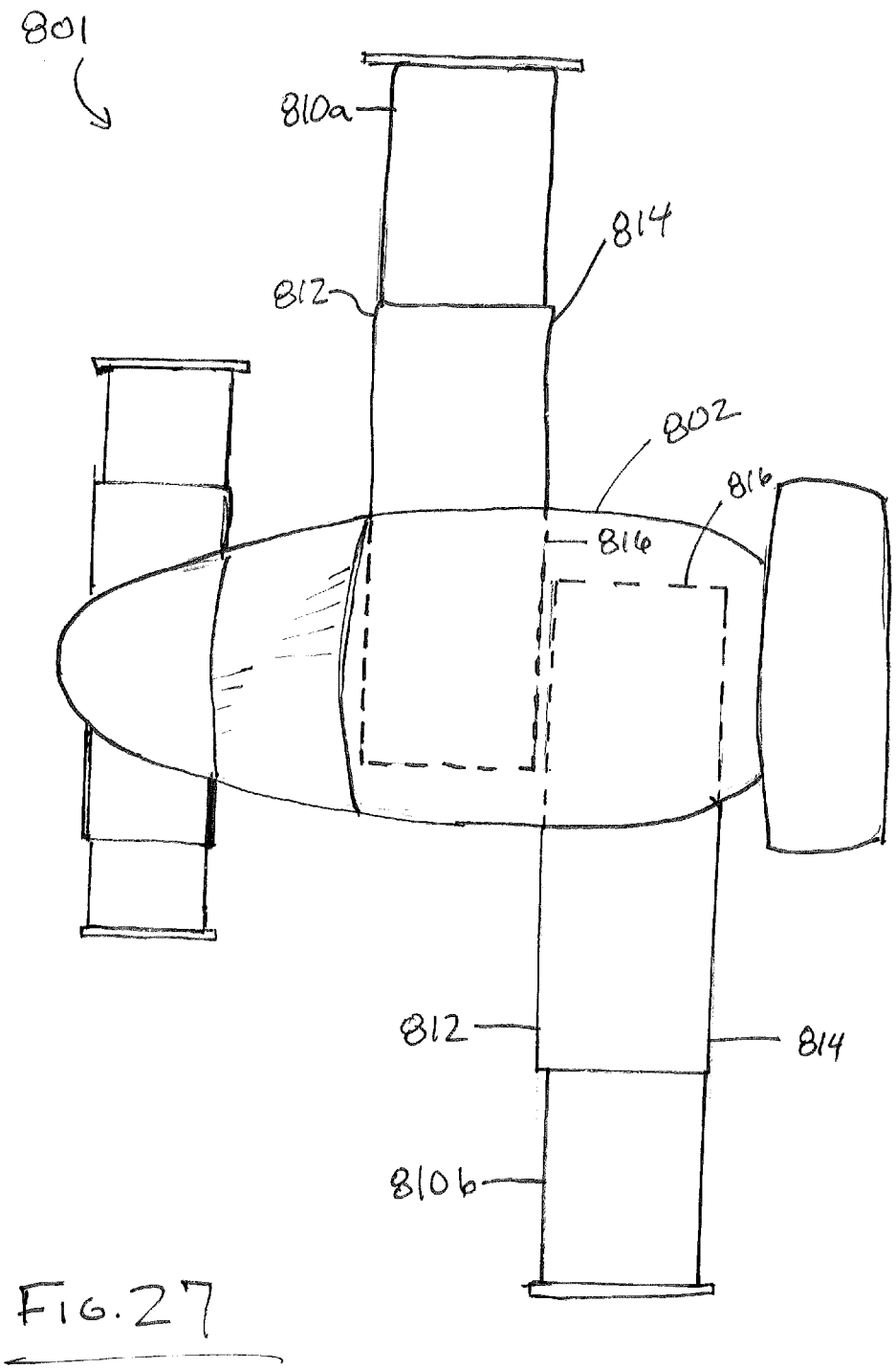
FIG. 27 is a top view of an aircraft having longitudinally offset telescopic wings.

In the foregoing embodiments, it is disclosed that the aircraft 1 is provided with a pair of telescopic wings 10 in side by side configuration for use as the primary flying surfaces of the aircraft 1. However, it should be understood that a pair of telescopic wings 10 could be offset with respect to one another, as shown in FIGS. 23-24 and 27.

In particular, an aircraft 701 may be provided with a pair of telescopic wings 710a, 710b in a vertically-stacked configuration (FIGS. 23-24), wherein a first wing 710a is elevationally-offset with respect to a second wing 710b. A secondary pair of elevationally offset telescopic wings 711a, 711b may also be provided.

Each of the first wing 710a and the second wing 710b have a top surface 712 and a bottom surface 714. In the aircraft 701, the bottom surface 712 of the first wing 710a is disposed at a higher elevation than the top surface 714 of the second wing 710b. The first wing and the second wing are otherwise directly across from one another with respect to a fuselage 702 of the aircraft 701, such that they are not longitudinally offset with respect to one another. Thus, the first wing 710a and the second wing 710b are at the same longitudinal position with respect to the front and rear of the aircraft 701. Internal bays 716 are provided for each of the first wing 710a and the second wing 710b such that the wing panels of the first wing 710a and the wing panels of the second wing 710b are retractable into the fuselage 702 of the aircraft 701 such that at least a portion of the first wing 710a substantially overlies at least a portion of the second wing 710b. Each of the first wing 710a and the second wing 710b may include a collapsible spar assembly (not shown in FIGS. 23-24), as taught in previous embodiments, for moving the first wing 710a and the second wing 710b, respectively, between an extended position and a retracted position.

As another example, an aircraft 801 having a fuselage 802 is provided with a pair of telescopic wings 810a, 810b (FIG. 27), which are similar to the telescopic wings described in previous embodiments but differ therefrom in that they are longitudinally offset with respect to one another. Each of the first wing 810a and the second wing 810b have a leading edge 812 and a trailing edge 814. A trailing edge 814 of the first wing 810a is disposed forward of a leading edge 812 of the second wing 810b in a direction defined with respect to the front and rear of the aircraft 701. At least a portion of each of the first wing 810a and the second wing 810b may be retractable into an internal bay 816 that is defined within the fuselage 802 of the aircraft 801. The first wing 810a and the second wing 810b are preferably at the same elevation with respect to one another. However, it is expressly contemplated that the first wing 810a and the second wing 810b could be offset both longitudinally and elevationally.

Figure 25:
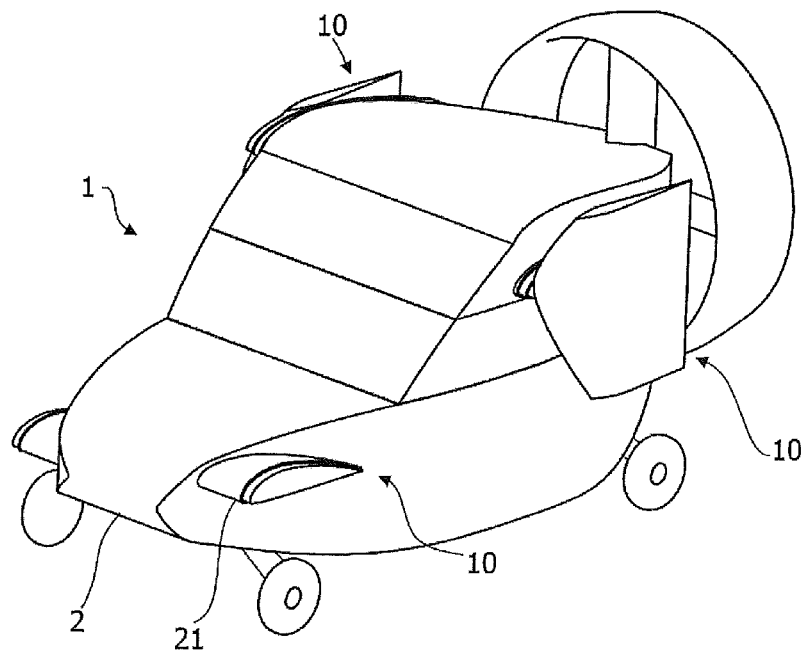
FIG. 25 is a perspective view of an aircraft having an integral root portion.
Figure 26:
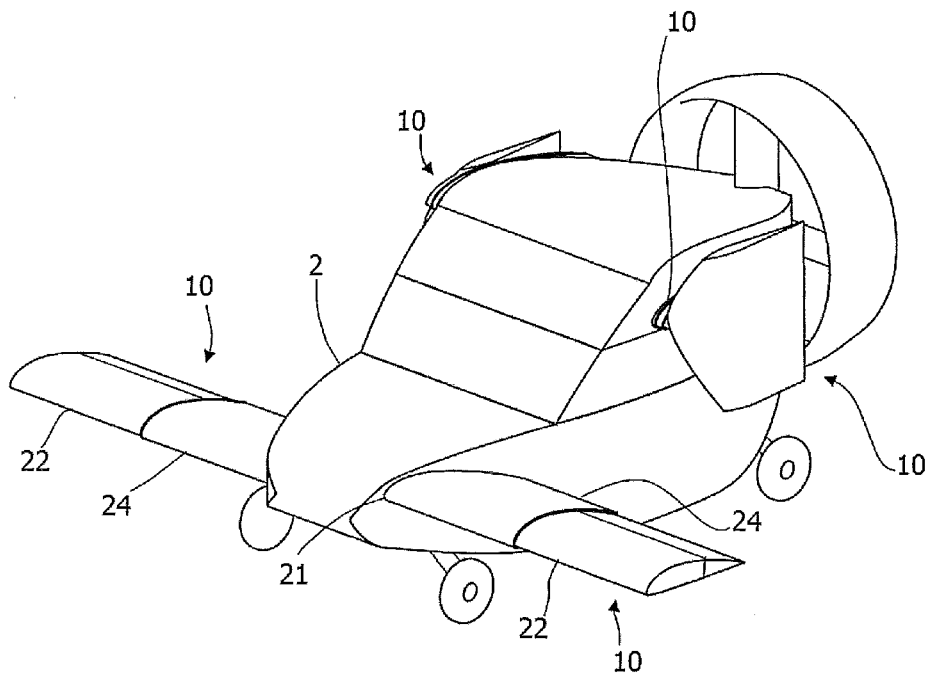
FIG. 26 is a perspective view of an aircraft having an integral root portion.

Also, in the foregoing embodiments, the root panel 20 is described above as part of the flight surface of the aircraft 1. However, it should be understood that the root panel could omit the skin 30, and be disposed entirely within the fuselage 2 of the aircraft 1, thus forming a root portion or root opening 21 in the fuselage 2 of the aircraft 1, into which the telescopic wing 10 may retract, as shown in FIGS. 25-26.

It should further be understood from the foregoing that the telescopic wing 10 may be provided with two or more spar assemblies 70, thereby enhancing the structural rigidity of the telescopic wing 10 and enhancing the telescopic motion of the wing panels 20, 22, 24 with respect to one another.

From the foregoing, it can be appreciated that the telescopic wing structures taught herein provide a simple and practical means for shortening the length of an aircraft wing, so that the aircraft may be converted for on-road use, or simply to allow for convenient storage of the aircraft. It can also be appreciated that, by providing articulated structural spars, telescopic wings may be provided having superior structural characteristics, without undue complexity or excessive manufacturing costs.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. An aircraft, comprising:
   a fuselage;
   a first wing that is connected to the fuselage, the first wing having at least two wing panels, the at least two wing panels telescopically related to one another for movement between an extended position and a retracted position; and
   a second wing that is connected to the fuselage, the second wing having at least two wing panels, the at least two wing panels telescopically related to one another for movement between an extended position and a retracted position,
   wherein the first wing and the second wing are positioned with respect to the fuselage such that the first wing is offset with respect to the second wing and at least a portion of the first wing and at least a portion of the second wing telescopically retract into the fuselage during movement from the extended position to the retracted position, and
   wherein the at least two wing panels of the first wing and the at least two wing panels of the second wing do not pivot with respect to the fuselage during movement of the first wing and the second wing between the extended position and the retracted position.

2. The aircraft of claim 1, wherein the first wing is elevationally offset with respect to the second wing.

3. The aircraft of claim 2, wherein a bottom surface of the first wing is disposed at a higher elevation than a top surface of the second wing.

4. The aircraft of claim 1, wherein the first wing is longitudinally offset with respect to the second wing.

5. The aircraft of claim 4, wherein a trailing edge of the first wing is disposed forward of a leading edge of the second wing in a direction defined with respect to the front and rear of the aircraft.

6. The aircraft of claim 1, wherein the first wing and the second wing are disposed at the same longitudinal position with respect to the front and rear of the aircraft.

7. The aircraft of claim 1, wherein the wing panels of the first wing and the wing panels of the second wing are retractable into the fuselage such that at least a portion of the first wing substantially overlies at least a portion of the second wing.

8. The aircraft of claim 1, further comprising:
   a first collapsible spar assembly for moving the first wing between the extended position and the retracted position; and
   a second collapsible spar assembly for moving the second wing between the extended position and the retracted position.

9. The aircraft of claim 1, further comprising:
   a first spar assembly that connects at least one of the wing panels of the first wing to the fuselage for providing structural support to the first wing, the spar assembly having a plurality of links that are pivotally connected to one another, wherein each link of the plurality of links of the first spar assembly extends parallel to a first extension axis of the first wing when the first wing is in the extended position, and adjacent links of the plurality of links of the first spar assembly form acute interior angles with respect to one another when the first wing is in the retracted position; and
   a second spar assembly that connects at least one of the wing panels of the second wing to the fuselage for providing structural support to the second wing, the second spar assembly having a plurality of links that are pivotally connected to one another, wherein each link of the plurality of links of the second spar assembly extends parallel to a second extension axis of the second wing when the second wing is in the extended position, and adjacent links of the plurality of links of the second spar assembly form acute interior angles with respect to one another when the second wing is in the retracted position,
   wherein the first spar assembly and the second spar assembly move the first wing and the second wing, respectively, between the extended position and the retracted position.

10. The aircraft of claim 1, wherein an innermost wing panel from the at least two wing panels of the first wing and an innermost wing panel from the at least two wing panels from the second wing each telescopically retract into the fuselage during movement of the first wing and the second wing from the extended position to the retracted position.

11. The aircraft of claim 1, wherein all of the wing panels of the at least two wing panels of the first wing and all of the wing panels of the at least two wing panels of the second wing move telescopically during movement of the first wing and the second wing between the extended position and the retracted position.

12. The aircraft of claim 1, wherein the at least two wing panels of the first wing move telescopically with respect to one another during movement of the first wing between the extended position and the retracted position along a first extension axis that extends outward from the fuselage at a fixed angle with respect to the fuselage and the at least two wing panels of the second wing move telescopically with respect to one another during movement of the second wing between the extended position and the retracted position along a second extension axis that extends outward from the fuselage at a fixed angle with respect to the fuselage.

13. The aircraft of claim 1, wherein the first wing and the second wing are not pivotable with respect to the fuselage.

14. The aircraft of claim 1, wherein the at least two wing panels of the first wing and the at least two wing panels of the second wing are not pivotable with respect to the fuselage.

15. The aircraft of claim 1, wherein the first wing and the second wing are positioned with respect to the fuselage such that the first wing is offset with respect to the second wing when the first wing and the second wing are in the extended position and when the first wing and the second wing are in the retracted position.

16. An aircraft, comprising:

a fuselage;

a first wing that is connected to the fuselage, the first wing having at least two wing panels, the at least two wing panels telescopically related to one another for telescoping movement along a first extension axis between an extended position, wherein an outermost wing panel of the at least two wing panels of the first wing is not disposed in the fuselage, and a retracted position, wherein an outermost wing panel of the at least two wing panels of the first wing is at least partially disposed within the fuselage; and a second wing that is connected to the fuselage, the second wing having at least two wing panels, the at least two wing panels telescopically related to one another for telescoping movement along a second extension axis between an extended position, wherein an outermost wing panel of the at least two wing panels of the second wing is not disposed in the fuselage, and a retracted position, wherein an outermost wing panel of the at least two wing panels of the second wing is at least partially disposed within the fuselage, wherein the first wing and the second wing are positioned with respect to the fuselage such that the first wing is offset with respect to the second wing, and wherein the at least two wing panels of the first wing and the at least two wing panels of the second wing do not pivot with respect to the fuselage during movement of the first wing and the second wing between the extended position and the retracted position.

* * * * *